United States Patent [19]

Chou

[11] Patent Number: 5,274,875
[45] Date of Patent: Jan. 4, 1994

[54] DISPLACEABLE REAR WINDSHIELD WIPER INCORPORATING TRUNK LID INTERACTION AND A REAR BRAKE LIGHT

[76] Inventor: Liao-Ter Chou, P.O. Box 67-600, Taipei, Taiwan

[21] Appl. No.: 8,304

[22] Filed: Jan. 25, 1993

[51] Int. Cl.[5] ............ B60S 1/58; B60S 1/04
[52] U.S. Cl. ............ 15/250.19; 15/250.001; 296/76; 296/96.15
[58] Field of Search ........... 15/250.19, 250.20, 250.16, 15/250.17, 250.24, 250.001, 250.3, 250.35; 296/76, 96.15

[56] References Cited

U.S. PATENT DOCUMENTS

| | | | |
|---|---|---|---|
| 2,784,438 | 3/1957 | Petersen | 15/250.19 |
| 5,079,794 | 1/1992 | Lake | 15/250.23 |
| 5,090,082 | 2/1992 | Alber et al. | 15/250.001 |

FOREIGN PATENT DOCUMENTS 0095234  6/1982  Japan ............... 15/250.19

Primary Examiner—Harvey C. Hornsby
Assistant Examiner—Gary K. Graham
Attorney, Agent, or Firm—Morton J. Rosenberg; David I. Klein

[57] ABSTRACT

A vehicle windshield wiper system is provided which includes a body or housing within which is mounted a driving motor, a solenoid, a brake lamp as well as a pull rope. The pull rope extends between the solenoid and the windshield wiper and is guided by a pair of guide wheels or pulleys. The solenoid is energized or actuated by the displacement of the lid of the trunk of the vehicle to displace the windshield wiper away from the rear window of the vehicle. The subject windshield wiper system allows a windshield wiper system to be easily and conveniently installed on four-door cars in a manner which allows the windshield wiper to obviate any interference between the windshield wiper and the trunk lid of a car when the trunk lid is displaced to an open position.

1 Claim, 4 Drawing Sheets

DISPLACEABLE REAR WINDSHIELD WIPER INCORPORATING TRUNK LID INTERACTION AND A REAR BRAKE LIGHT

BACKGROUND OF THE INVENTION

1. Field of the Invention

The subject invention is directed to car windshield wipers. In particular, the subject windshield wiper system is adapted to be installed on vehicle trunk lids for interface with rear windows of four-door cars to remove dirt and other debris on rear windows in order to improve driving safety.

Windshield wipers are known to be a particular fixture which is indispensable to vehicles. Windshield wipers permit removal of debris on windows of vehicles to aid the driver in maintaining good visual acuity which raises the safety level of driving.

2. Prior Art

Among various models of the vehicles and cars produced by different manufacturers, with the exception of five-door cars having a hatch back with the windshield wiper mounted on the rear window, almost all four-door cars are unable to resolve the problem of interference incurred by the opening of the lid of the trunk resulting from the independent structure of the lid of the trunk and the rear window of the car which prevents installation of the windshield wiper on the rear window of the body of the car. Once dirt or rain stains accumulate on the rear window of the four-door car, such diminishes the rear view ability of the driver and may force parking of the car in order to wipe clean the rear window. During rainy days, or encountering heavy rain, such causes the rear window to lose its visual transparency function and affects the rear viewing ability of the driver. The driver is further hindered in that parking of the car to wipe off the rain may be difficult in certain circumstances.

The subject windshield wiper, to be used specifically on the rear window of conventional four-door cars eliminates the problem of the previously stated interference and allows it to be conveniently installed on the lid of the trunk which increases the level of driving safety. Prior art windshield wipers providing the above effect are not known to the inventor.

In order to improve the above disadvantages, the present invention provides an innovative design of a car windshield wiper allowing installation on the rear window of four-door cars to remove debris, dirt and filth for improving the safety of driving.

SUMMARY OF THE INVENTION

The main feature of the present invention is to provide an innovative design of a car windshield wiper which includes a solenoid located internal the housing or body of the windshield wiper of a car to be actuated with the opening of the trunk lid which tensions a pull rope, causing the windshield wiper to be displaced from the rear window of the car in order to resolve the problem of any interference caused by opening the lid of the trunk of the four-door car which allows cars of that particular type to have a windshield wiper installed on the rear window.

Another feature of the present invention is to provide a windshield wiper to be used on the rear window of a car by using the space and installing position of the housing to have included therein a third braking lamp. The driving components of the windshield wiper are all located in the interior of the housing or body of the windshield wiper system and is installed on the trunk lid of the car.

DESCRIPTION OF THE PREFERRED EMBODIMENTS

Figure 1:
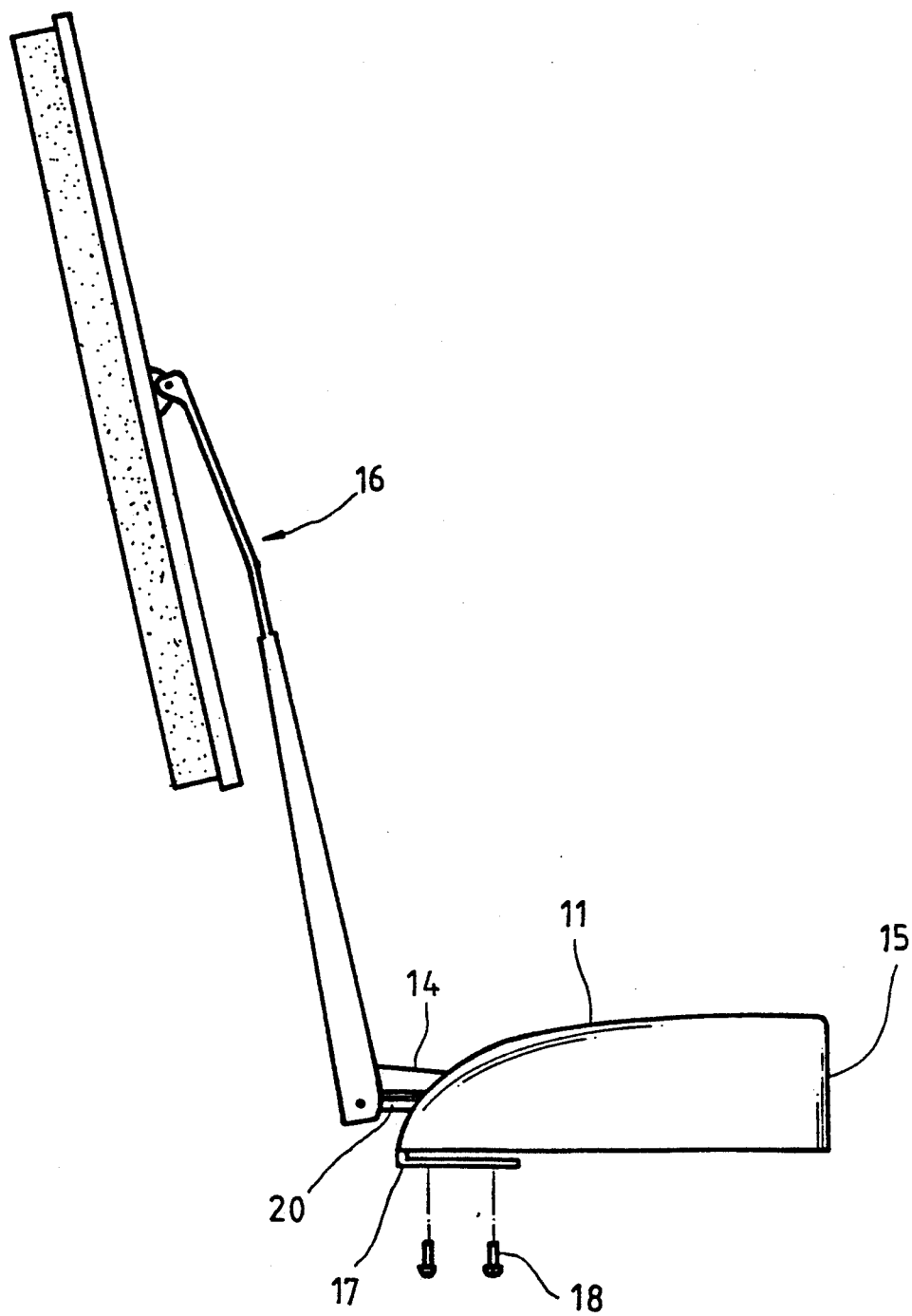
FIG. 1 is an elevational view of the car windshield wiper system of the present invention concept.
Figure 2:
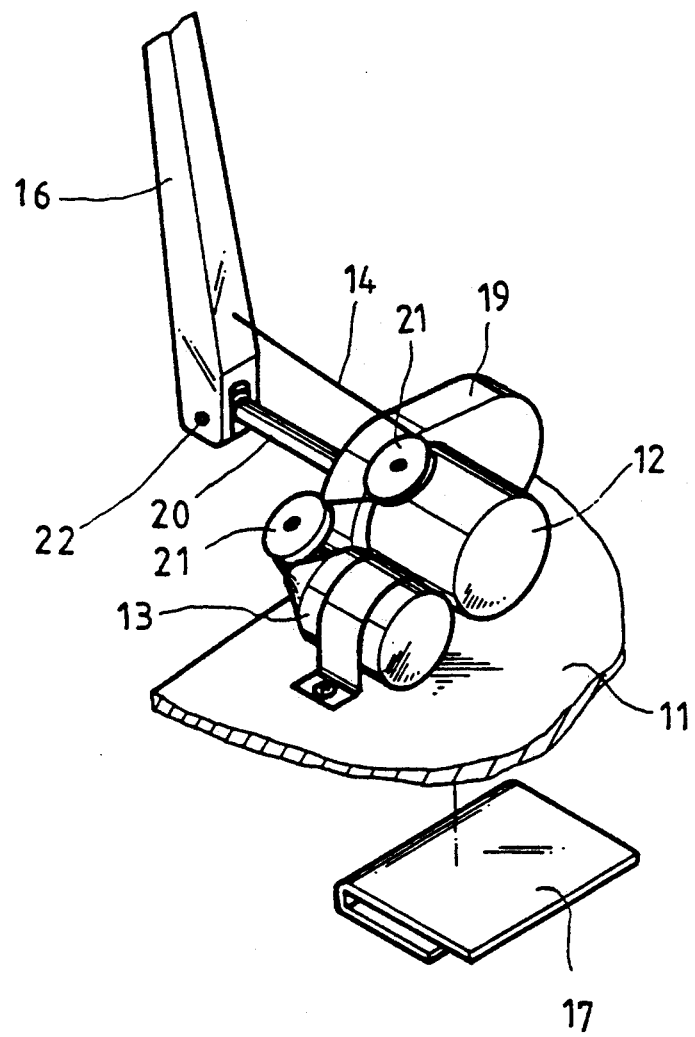
FIG. 2 is a perspective view of the structure of the driving components within the body or housing of the car windshield wiper system of the present invention; and, FIG. 3 is a perspective view of the subject windshield wiper system mounted on a four-door car.
Figure 3:
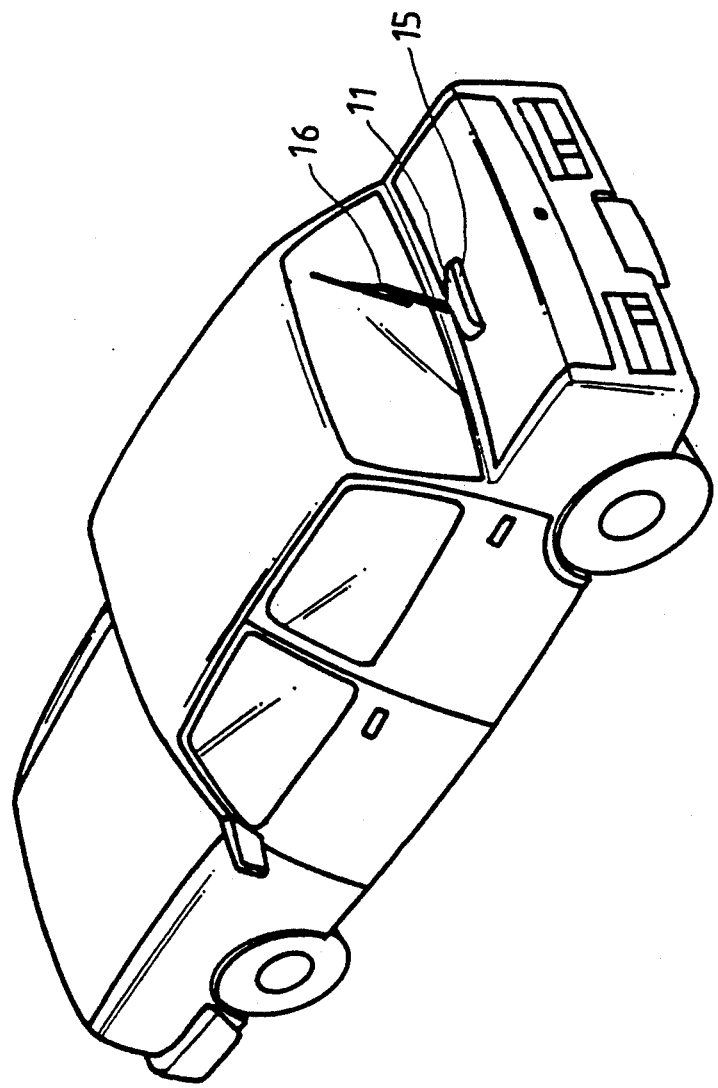
Figure 4:
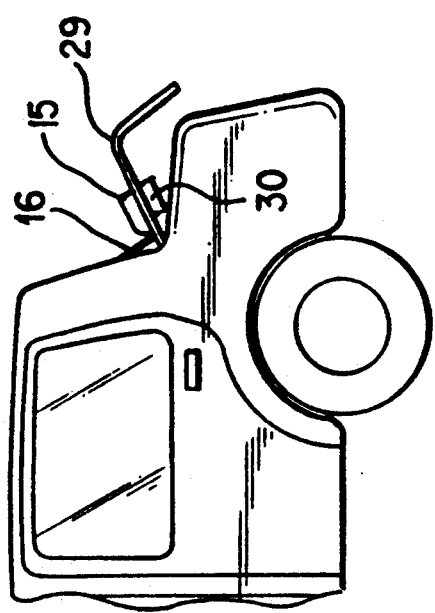
FIG. 4 is a side view of the car showing the trunk lid and wiper system mounted thereon.

Referring now to FIGS. 1-3, there is shown the car windshield wiper system of the subject invention constituted by the housing or body 11 which includes driving motor 12, solenoid 13, pull rope 14, brake lamp 15 to be installed in a rear portion of the body or housing 11, and windshield wiper 16 installed on the front portion of the body or housing 11 driven by the shaft of motor 12.

The housing 11 includes U-shaped fixture or member 17 with a rear opening on the bottom edge of the body or housing 11 to clamp the housing 11 to the edge of the lid (29) the trunk adjacent to the rear window of the car and secured with threaded screw members 18. This allows positioning of the housing 11 of the windshield wiper system to the lid of the trunk quickly and conveniently while allowing the windshield wiper 16 on the front portion of the housing 11 to contiguously interface with the vehicle rear window.

Referring to FIG. 2, motor 12 is installed in the interior of the body or housing 11 and is coupled to speed reducer 19 secured to the front end of the motor 12. The output end of spindle 20 of speed reducer 19 is pivotally coupled to the windshield wiper 16 by means of insert pin 22 allowing reversible displacement of the windshield wiper 16 adjacent and contiguous the rear window of the car.

Solenoid 13 is mounted on one side of the motor 12 as shown. Guide wheels or pulleys 21 are mounted on the solenoid 13 and the motor 12 respectively for guiding pull rope 14 which extends from the solenoid 13 via the two guide wheels 21 to windshield wiper 16. Solenoid 13 is energized or actuated by the opening of the lid of the trunk through any standard switch member, such as switch (30) well known in the art. Upon raising the lid of the trunk, solenoid 13 is energized or triggered to tension the pull rope 14 and cause the bottom end of the windshield wiper 16 to displace the windshield wiper 16 away from the rear window by pivoting about insert pin 22 to facilitate the opening of the lid of the trunk.

On closing the lid of the trunk, solenoid 13 releases the pull rope 14 and the windshield wiper 16 is displaced against and contiguous the rear window by means of a resilient force of a standard spring mounted in the windshield wiper 16.

The overall structure of the above windshield wiper system is unique since it allows the windshield wiper 16 to contiguously interface and be displaced from the rear window of the car responsive to opening and closing of the lid of the trunk in order to resolve any problem of interference resulting from the opening of the lid of the trunk. In general, four-door cars are capable of being installed with the windshield wiper 16 on the rear windows to eliminate disturbances of rain stains and filthy substances.

Further, the present device is able to utilize fully the space and positioning of the installation to mount a third braking lamp together with the driving components of the windshield wiper in the interior of the housing 11. The windshield wiper installation on the lid of the trunk provides for incorporation of the third braking lamp in a combined manner. The overall design of the present invention system is believed to be unprecedented and is further believed to be an innovative practical structure for a car windshield wiper.

I claim:

1. A rear windshield wiper system mounted on a vehicle trunk lid, which is pivotally mounted on a vehicle for movement between open and closed positions, said wiper system comprising:
   (a) a hollow windshield wiper housing having a front and rear portion and a bottom all, a drive motor mounted in said housing, speed reduction gearing means coupled to the motor for reducing rotative speed of said motor, an elongated spindle coupled at one end to the reduction gearing means and at the other end, which extends from said housing, to a windshield wiper, said wiper is pivotally mounted to said spindle by an insert pin and is located adjacent a rear windshield of said vehicle for wiping thereover;
   (b) a brake lamp mounted to said rear portion of said windshield wiper housing;
   (c) switch means to determine said open and closed positions of said trunk lid;
   (d) a solenoid mounted in said housing and actuated by said switch means;
   (e) a U-shaped member mounted to said bottom wall of said housing and coupled to said trunk lid for securing said housing to said trunk lid;
   (f) a pair of guide pulleys respectively mounted on said solenoid and said drive motor; and,
   (g) an elongated pull rope member secured on one end to said solenoid and on an opposing end to said windshield wiper, said pull rope member extending around said guide pulleys for tensioning of said pull rope member and displacement of said windshield wiper about said pin, relative to said windshield when said solenoid is actuated.

* * * * *